Figure 1:
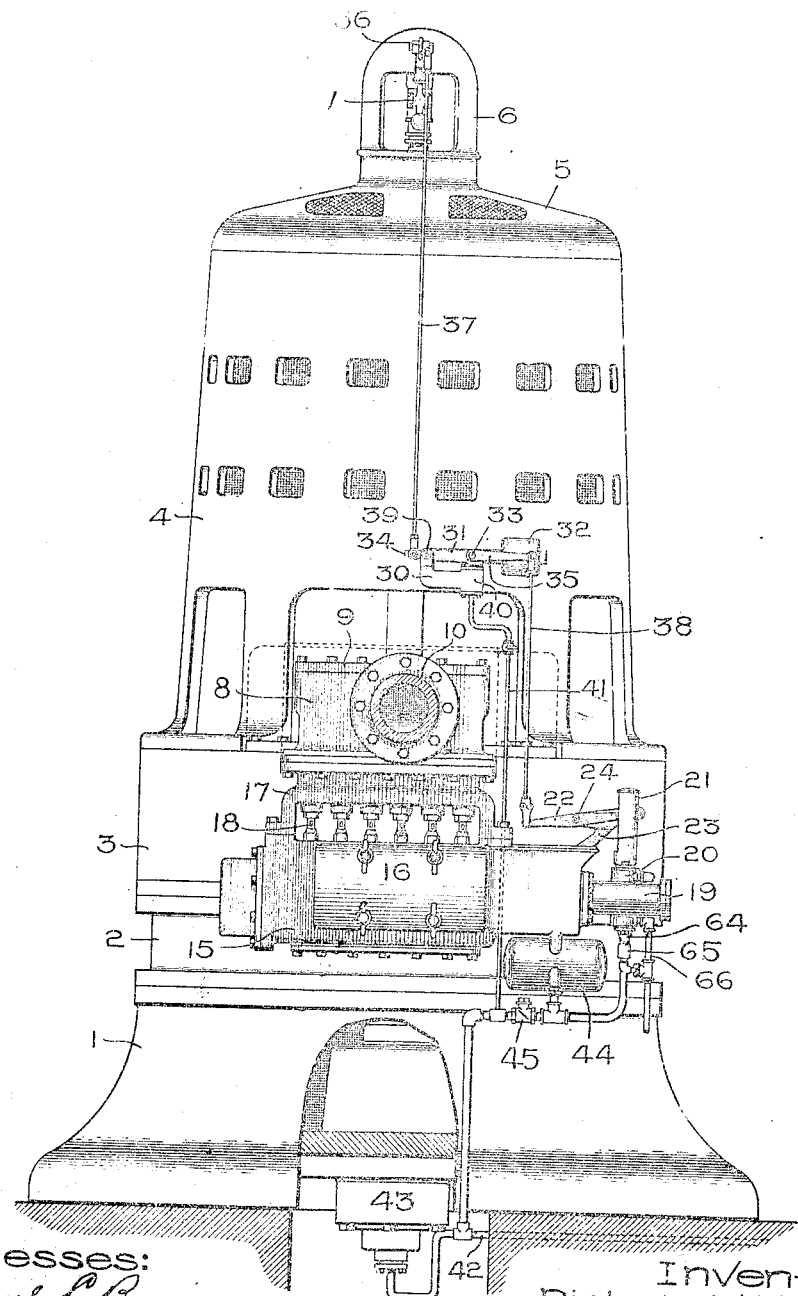

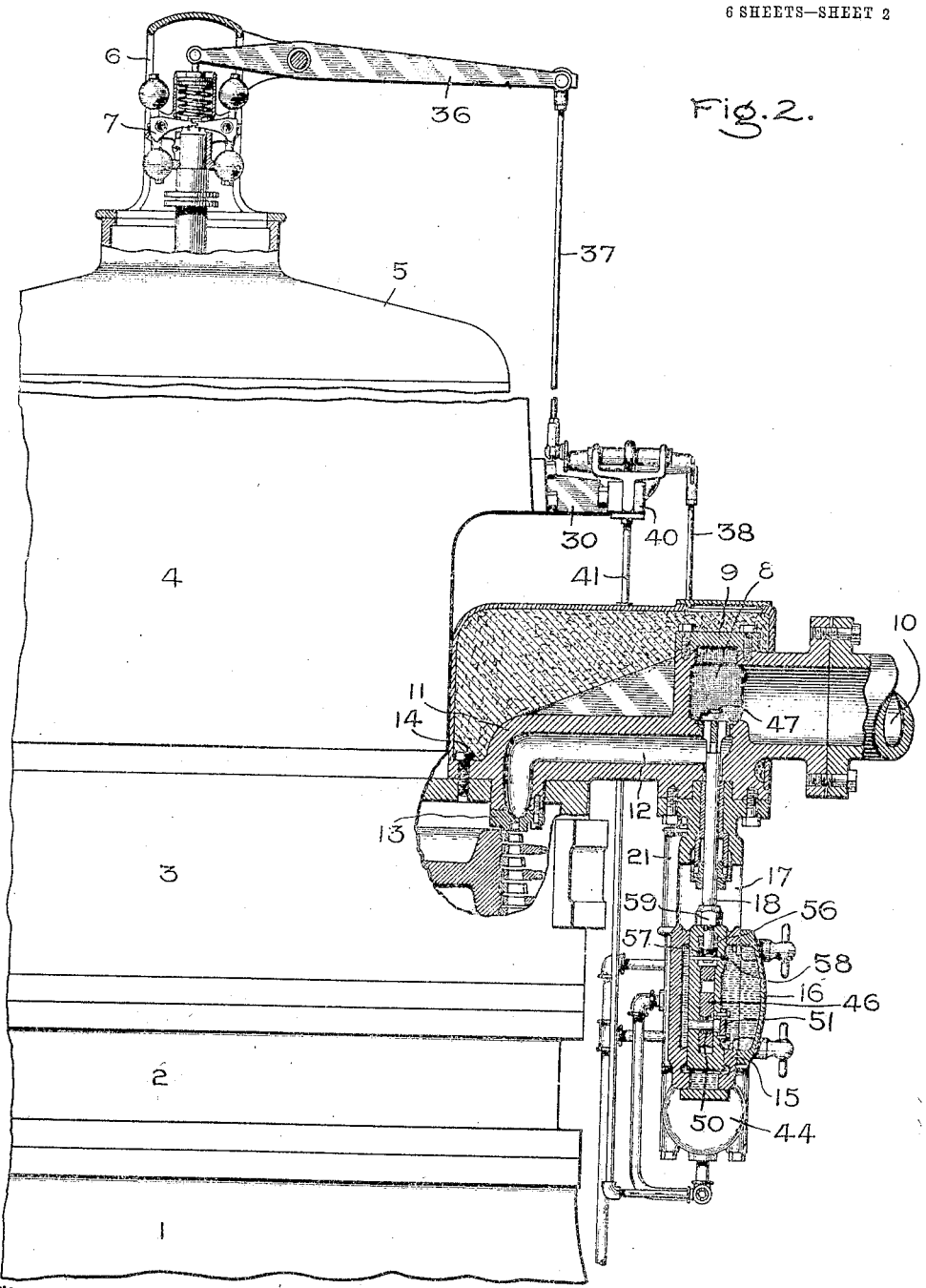

No. 796,451. PATENTED AUG. 8, 1905.
R. H. RICE.
GOVERNING MECHANISM FOR ELASTIC FLUID TURBINES.
APPLICATION FILED FEB. 6, 1904.
6 SHEETS—SHEET 3.
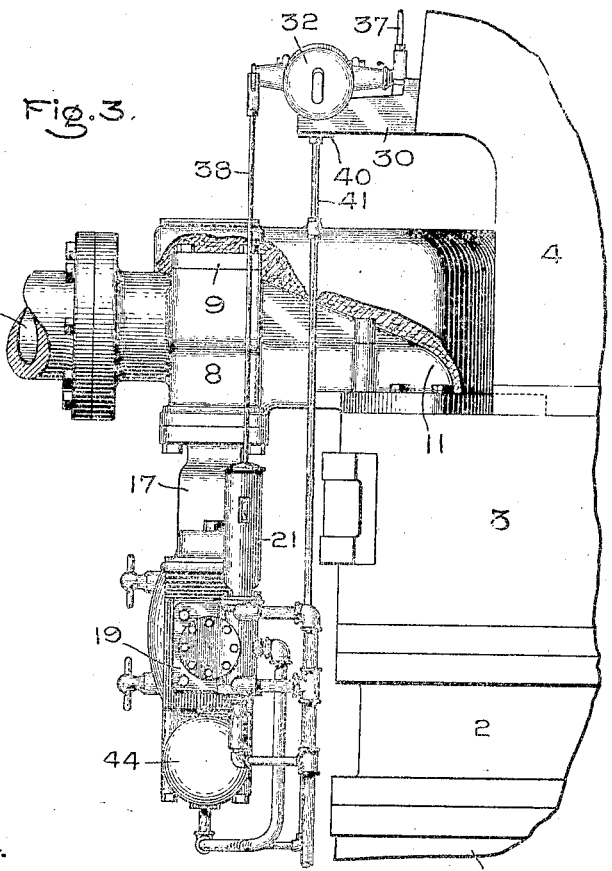
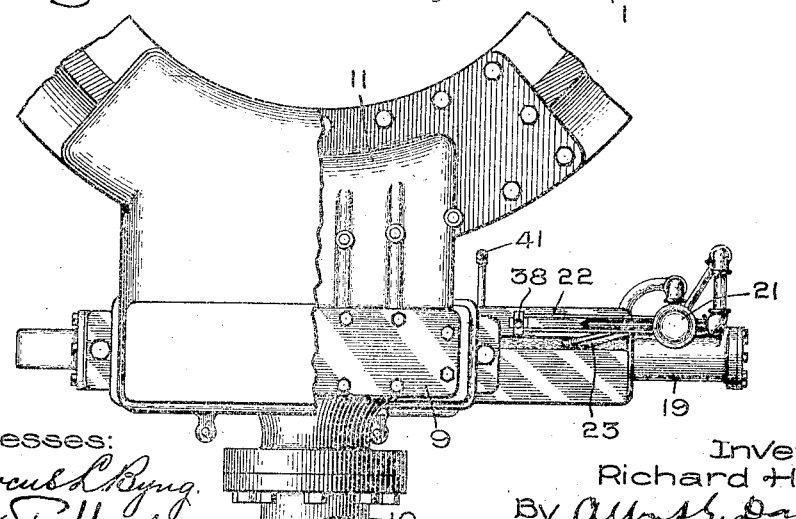
Witnesses:
Marcus L. Byng.
Alex F. Macdonald.
Inventor
Richard H Rice
By Albert G. Davis
Att'y

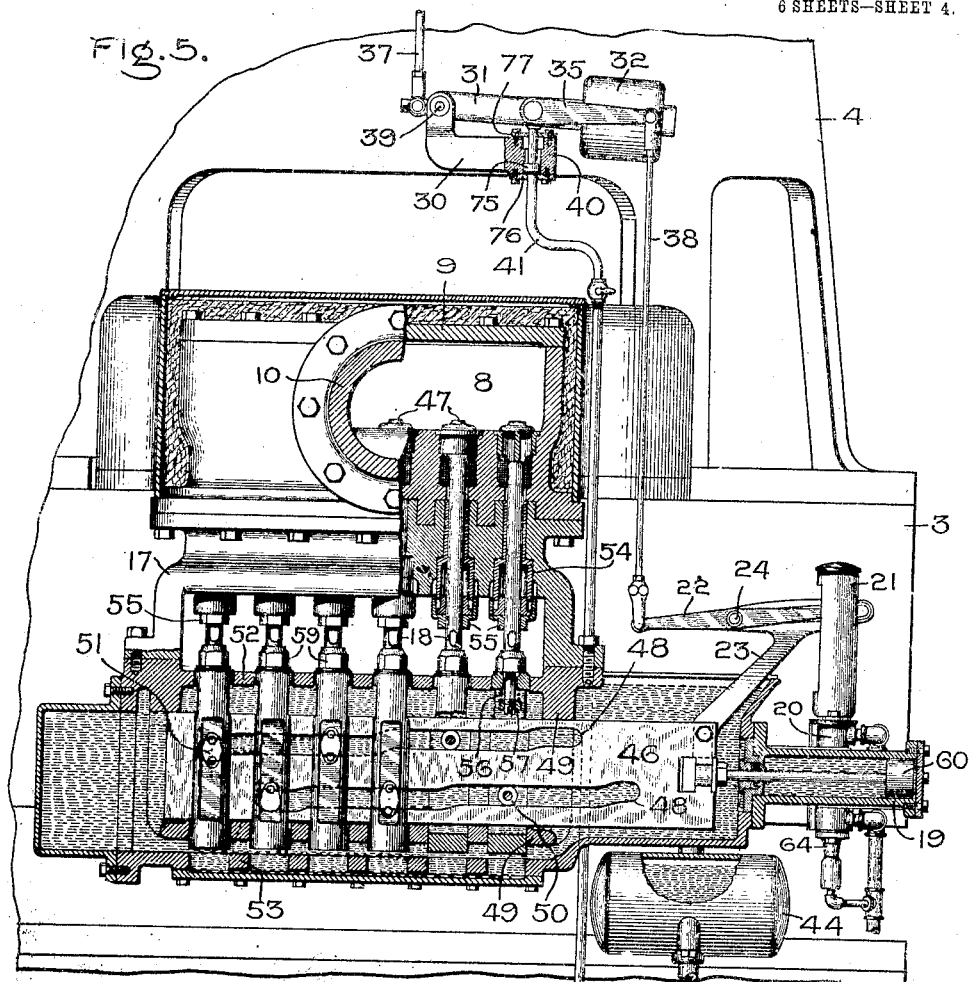

No. 796,451. PATENTED AUG. 8, 1905.
R. H. RICE.
GOVERNING MECHANISM FOR ELASTIC FLUID TURBINES.
APPLICATION FILED FEB. 6, 1904.
6 SHEETS—SHEET 5.
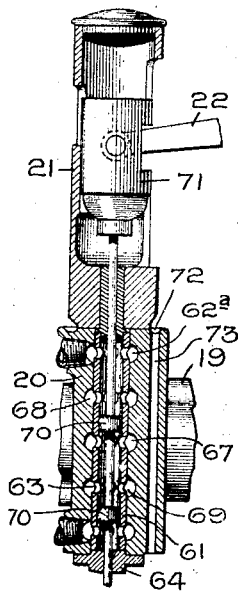
Fig. 9.
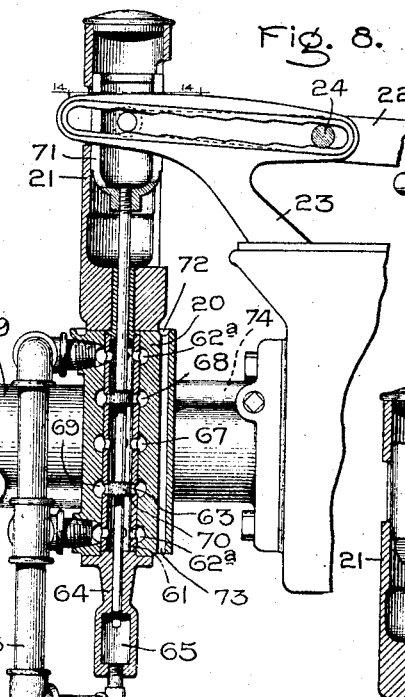
Fig. 8.
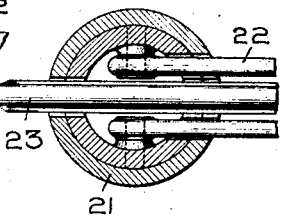
Fig. 14.
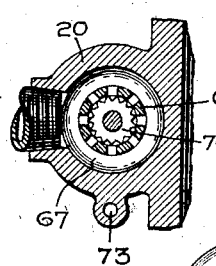
Fig. 12.
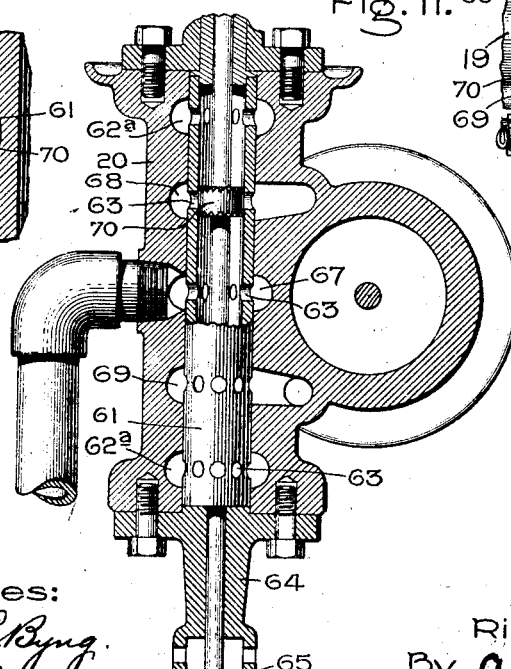
Fig. 11.
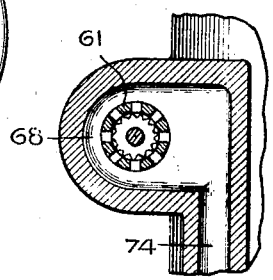
Fig. 10.
Fig. 13.
Witnesses:
Marcus L. Byng.
Alex F. Macdonald.
Inventor,
Richard H. Rice,
By Albert G. Davis
Att'y.

No. 796,451. PATENTED AUG. 8, 1905.
R. H. RICE.
GOVERNING MECHANISM FOR ELASTIC FLUID TURBINES.
APPLICATION FILED FEB. 6, 1904.
6 SHEETS—SHEET 6.
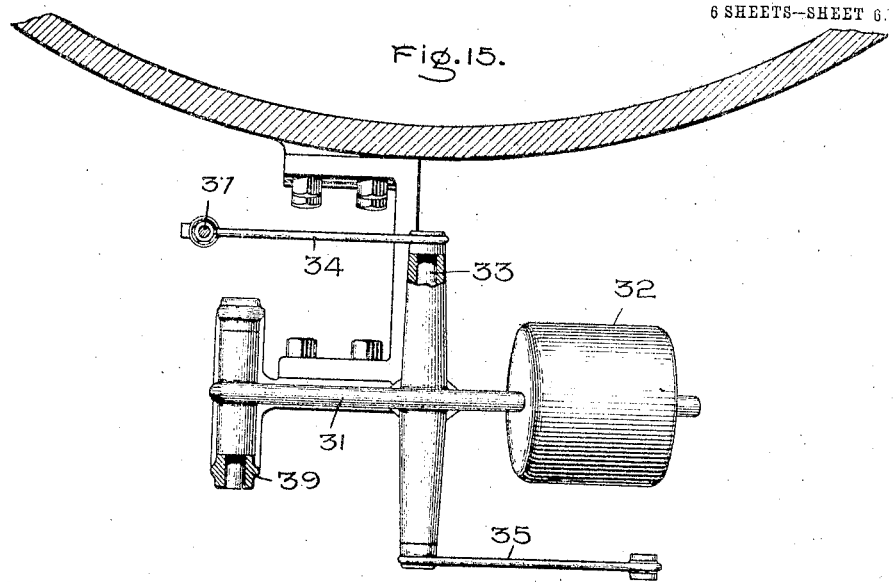
Witnesses
Marcus L. Byng.
Alex F. Macdonald.
Inventor
Richard H. Rice
By Albert G. Davis
Att'y.

UNITED STATES PATENT OFFICE.

RICHARD H. RICE, OF SWAMPSCOTT, MASSACHUSETTS, ASSIGNOR TO GENERAL ELECTRIC COMPANY, A CORPORATION OF NEW YORK.

GOVERNING MECHANISM FOR ELASTIC-FLUID TURBINES.

No. 796,451.

Specification of Letters Patent.

Patented Aug. 8, 1905.

Application filed February 6, 1904. Serial No. 192,318.

*To all whom it may concern:*

Be it known that I, RICHARD H. RICE, a citizen of the United States, residing at Swampscott, in the county of Essex and State of Massachusetts, have invented certain new and useful Improvements in Governing Mechanisms for Elastic-Fluid Turbines, of which the following is a specification.

The present invention has for its object to provide a governing mechanism of improved construction which will effectively regulate the speed of a turbine over wide ranges in load and which will shut the machine down under abnormal conditions,—for example, when the pressure on the bearing or bearings decreases below a certain amount.

In carrying out the invention as many nozzles, nozzle-sections, or other discharging devices are provided as are necessary to handle the total volume of motive fluid, and some or all of these nozzles, nozzle-sections, or other discharging devices are provided with controlling-valves, which are regulated in their action by a governor of any suitable construction, preferably one which is responsive to speed variations. The valves are so constructed and arranged that they are separately adjustable and removable and this in a simple manner and without taking down any substantial part of the mechanism. Each valve includes a yielding connection in the stem which compensates for slight irregularities in workmanship or faulty adjustment. The valves are successively opened and closed by a cam-bar, which in turn is moved by a reversible motor. I have shown by way of illustration a hydraulic motor comprising a cylinder and piston. Each valve-stem has a slotted cross-head to receive the cam-bar, and mounted thereon is an antifriction-roller. The bar, cross-heads, rollers, &c., are all inclosed in a fluid-tight casing containing a lubricant. The front side of the casing is provided with a door, which makes a sealed joint, and the valve-stem passes out through the top, so as to avoid the use of packings. The casing overhangs the side of the turbine, and each part of the mechanism is arranged so that it is readily accessible. In order to avoid making the bar unduly long, two or more cam grooves or surfaces are provided thereon, and each groove or surface is arranged to move one or more valves. The general direction of these grooves or surfaces is the same, and the valves are so related to each other and to the bar that they operate successively under changes in load. In order to provide for a short movement of the bar and also to distribute the load evenly thereon, alternate valves are actuated by the same cam groove or surface, it being understood that they are properly formed for this purpose. In this manner a considerable distance is provided between adjacent cam projections in the same groove without causing an extended movement of the bar. The cam-bar may be directly or indirectly connected to the movable part of a reversible motor, such as the piston of a hydraulic motor. The motor is under the control of a regulator or valve which is actuated through suitable mechanism by the governor or speed-responsive device. Attached to or moving under the action of the bar is a restoring device, which after the bar has moved one or more valves controlling the admission of motive fluid to the turbine returns or restores the motor-regulator to an intermediate or neutral position and in the case of a hydraulic motor confines a body of non-compressible fluid on each side of the piston. This restoring device is operative for each valve controlling the admission of motive fluid to the turbine, which to distinguish them from the other valves will be hereinafter referred to as "nozzle-valves," and comes into play whether the bar moves longitudinally in one direction or the other. The restoring device can with advantage take the form of a cam and is preferably so arranged that the admission-valve to the motor is fully opened, or nearly so, before it commences to close it. This arrangement eliminates the throttling of steam or other elastic fluid to the nozzles or other discharging devices by making the parts quick-acting and is therefore an important feature. In case it be desired to obtain a throttling of the fluid to one or more of the nozzle-valves before closing for any reason the shape of the restoring and bar cams can be altered slightly to accomplish it.

Entering into and forming a part of the mechanism between the governor and the nozzle-valves is a movable support, which under predetermined conditions—such, for example, as a failure of the main source of lubricant-supply for the turbine-bearings—causes the latter to close all of the valves. The fluid for actuating the motor may be that employed to lubricate the bearing or bearings of the turbine or not, as is most convenient and desirable to meet the specified conditions. Water or oil can be used, as desired. This forms what may be called an "emergency" device. In the present illustration of the invention the support is in the form of a hydraulic motor, which is subjected to the pressure of the same fluid that operates the motor and acts directly on the motor-controlling valve in a manner to cause it to admit fluid to the cylinder. The support raises or lowers the pivotal point of what I term the "floating lever," which is connected at one end to the speed-responsive device and at the other end to the motor-controlling valve.

In order to insure a supply of fluid for the motor in case of emergency, such as a failure of the main supply, an accumulator containing air under pressure is arranged in circuit between the source of supply and the motor with a check-valve that prevents the return of fluid from the accumulator to the said source. The accumulator should contain a sufficient amount of fluid and under the requisite pressure to quickly move the cam-bar to its initial position irrespective of the position occupied at the time of failure of the main source of supply. Time is an important element under such conditions, and the faster the cam-bar moves the better.

The fluid for operating the motor may be the same fluid which lubricates one or more of the turbine-bearings or it may be an independent source of supply, as desired. This will be determined largely by the character of the plant into which the turbine enters.

In the accompanying drawings, which illustrate one embodiment of my invention, Figure 1 represents a vertical turbine in side elevation fitted with one form of my improved governing mechanism. Fig. 2 is a partial view in section on an enlarged scale. Fig. 3 is a view in elevation of a part of the governing mechanism viewed from the opposite side to that of Fig. 2. Fig. 4 is a plan view of the valve-actuating mechanism. Fig. 5 is an enlarged sectional view of the cam-bar and other mechanism for operating the nozzle-valves. Fig. 6 shows the cam-bar in its extreme left-hand position where all the valves are open. Fig. 7 is a similar view with the cam-bar in an intermediate position and the controlling-valve of the motor set to admit fluid thereto. Fig. 8 is an enlarged longitudinal section through the valve which controls the hydraulic motor. Fig. 9 is another longitudinal view through the motor-controlling valve in a position to admit fluid to the right-hand end of the cylinder, viewed from the front, to increase the admission of motive fluid to the turbine. Fig. 10 is a similar view showing the valve in the raised position to cause the motor to decrease the admission of motive fluid to the turbine. Fig. 11 is an enlarged sectional view of the piston or motor-controlling valve viewed from the left-hand side of Fig. 1 and looking in the direction of the arrow. Figs. 12 and 13 are detail views showing the relation between the piston-valve and the ports. Fig. 14 is a sectional view taken on the line 14 14 of Fig. 8, showing the relation between the motor-controlling valve and the restoring device. Fig. 15 is a plan view of the double-arm floating lever which forms a part of the emergency device, and Figs. 16 to 20 are diagrams showing the relation of the parts under different conditions.

Referring to Fig. 1, I have shown my invention in connection with a two-stage vertical turbine of the jet type; but it is applicable to other types of turbine as well. 1 represents the base of the machine, which is connected to or forms a part of the condenser. Mounted above the base is a casing or shell 2 for the second or low-pressure stage. Mounted above this is a second shell or casing 3 for the first or high-pressure stage. Mounted above and supported by the high-pressure stage is a dynamo-electric machine 4 of suitable construction. The upper end of the dynamo is closed in by a cover 5, which carries a dome 6. The latter surrounds the governor or speed-responsive device 7 and forms a support for one of the actuating-levers. Mounted on the upper side of the first-stage shell or casing is a steam-chest 8 in which are a plurality of nozzle-valves for controlling the admission of motive fluid to the nozzle-passages or other discharging-orifices. The chest is lagged to prevent condensation and is provided with a detachable cover 9, through which the valves can be removed. The lagging is held in place by a metal casing which has a cover registering with the one for the chest. Steam or other elastic fluid under pressure is admitted to the chest by a conduit 10, which is flanged to receive the main steam-pipe from the boiler. The steam-chest is located some distance to one side of the turbine, as is clearly shown in Fig. 2, and formed on the left-hand side thereof is a projection 11, containing passages 12, that discharge into the sections of a nozzle 13. The nozzle may be of the expanding type or not and is attached to the extension of the valve-chest by bolts, and the valve-chest and attached parts are secured to the cover of the first-stage casing by bolts 14. Situated below the steam-chest and supported thereby is a casing 15, containing the valve-actuating mechanism, which casing is provided with a detachable front cover 16. The casing is supported from the steam-chest by a frame 17, that is provided with extensions on opposite ends through which retaining-bolts extend. Between the extensions on the frame is formed a space, and extending across this space are the valve-stems 18. Each of these stems is provided with suitable packing and adjusting means, which are accessible from either side of the valve mechanism for the purpose of adjustment or repair. Mounted on the end of the casing inclosing the valve-actuating mechanism is the cylinder 19 of a hydraulic reversing-motor. Situated on the back of this cylinder is a valve-casing 20, containing a piston-valve for controlling the action of the motor. Situated above the valve is a slotted cylindrical casing 21, containing the upper end of the valve-stem, with which the lever 22 is pivotally connected. Rigidly attached to the piston of the hydraulic motor is a restoring device or cam 23, which acts as a support for the pivot 24 of the lever. The restoring-cam is so designed that as it moves from one end of its stroke to the other the vertical position of the pivot is raised or lowered to meet the requirements.

Mounted in the bracket 30 on the side of the casing of the dynamo is a floating lever 31, which is loaded as by means of a weight 32 on its outer end, the weight tending at all times to move it into the position shown in Fig. 1. Mounted in the floating lever is a pivot 33, to which the arms 34 and 35 are rigidly attached. The arm 34 is attached to the lever 36 of the governor by the rod 37, the latter being provided with suitable adjusting means. The arm 35 is connected to the lever 22 of the motor-controlling valve by the rod 38, suitable adjusting means being also provided.

The floating lever is pivoted to the bracket by the shaft 39, and when the turbine is in operation is raised somewhat above the position shown by means of a hydraulic motor comprising a cylinder 40 and a piston reciprocating therein. Fluid under pressure is supplied to this motor by the pipe 41, which includes a valve for cutting the motor out of service. The lower end of this pipe is connected to the main pipe 42, leading from the source of supply. This motor forms a part of the emergency device and may receive its fluid from the same source which supplies lubricant to the step-bearing 43, or it may receive it from a separate source.

Situated below the valve-actuating mechanism and supported thereby is an accumulator 44, containing air under pressure. This accumulator receives fluid under pressure from the supply-pipe 42 and once the fluid enters it or the pipe beyond is prevented from returning by the check-valve 45. By reason of this construction there is always fluid enough to return the nozzle-valves to the closed position when the main source of supply fails.

Referring now to Figs. 2 to 7, inclusive, and particularly to Fig. 5, 46 represents the cam-bar for actuating the individual nozzle-valves 47, the latter being of the puppet type and engaging with removable seats supported by the steam-chest 9. The bar is provided with a number of cam-grooves 48, which extend longitudinally of the bar and substantially parallel with each other. The projections in one groove are staggered with respect to those in another groove. By reason of this construction the projections need not be crowded. This bar engages with guides 49, formed on the inclosing casing. Each of the stems of the valves is attached to a slotted cross-head arranged to receive the cam-bar, and the former is guided to a certain extent by the latter. Each cross-head is provided with a roller 50, that is carried by a detachable support 51. The upper end of each cross-head is guided by the wall 52 of the casing, and the lower end is guided by a partition 53, which extends across the lower end of the inclosing casing. The upper end of each valve-stem extends through a sleeve 54, which is secured in place in the frame 17. This sleeve makes a close fit with the valve-stem and forms a packing therefor. The lower end of the sleeve is provided with a nut 55, whereby the packing can be adjusted. Between the lower end of the stem 18 and the cross-head is a yielding connection comprising a spring 56, a nut 57 on the end of the stem, and a pin 58, which extends through a slot in the end of the stem and prevents the same from turning. Mounted on the stem and engaging with the cross-head is a nut 59. By adjusting this nut the position of the valve can be adjusted and also the tension on the spring 56. It is to be noted that the parts are all arranged in line and, furthermore, that they are so arranged that they can readily be removed.

In order to remove a valve, the cover 9 is taken off of the valve-chest, the lubricant removed from the casing inclosing the cam-bar, and the cover 16 detached. The pin 58 is then removed and the valve-stem and nut 59 rotated with respect to each other until the nut is detached. The packing 55 is then loosened slightly, and the valve and the attached stem can be passed up through the opening in the top of the steam-chest. In case it be desired to substitute new rollers 50 for engagement with the cam-grooves it is a simple matter to remove the plate 51, which holds the supporting-pin in place, and after removing the same a new roller can be inserted. Owing to the fact that the valve-actuating mechanism is working in oil, there is little or no tendency for the parts to become worn.

It is to be noted that alternate valves are actuated by the upper cam-groove, while the remaining valves are operated by the lower cam-groove. In other words, two sets of cam surfaces or projections are provided and a portion of the valves are operated by one set and a portion by the other. By reason of this relation of parts only a small movement of the bar is required to actuate all of the valves, and at the same time a bar of minimum length and width is provided.

Secured to the end of the cam-bar is a piston 60, which moves forward and back within the cylinder 19. Rigidly attached to the cam-bar is a restoring device or cam 23, which is provided with as many projections as there are projections on the cam-bar itself. In the present instance the cam-bar has six projections, three in each groove, and therefore the restoring device has six projections. The pitch of these projections must correspond with the pitch of the projections on the bar itself, although they need not be so pronounced. The function of these projections is to raise or lower the position of the pivot 24 on the valve-actuating lever 22. When the governor sets the lever 22 in a position to open the piston-valve controlling the hydraulic motor, the valve remains open until the restoring device has moved a distance equal to the pitch between one or more projections on the cam-bar. Ordinarily for each new position of the governor the cam-bar and restoring device are moved forward or back by a distance equal to the pitch of the cam projections, and if this is insufficient to compensate for the load change they will move a further and corresponding amount.

In Fig. 6 the cam-bar 46 is shown in the extreme left-hand position to open all of the valves, and the lever 22 is in a position to move the piston-valve controlling the hydraulic motor to a central or intermediate position.

In Fig. 7 the left-hand end of the lever 22 has been depressed by the governor-weights, which means that the speed is above normal, and the piston-valve has opened to admit fluid to the left-hand side of the piston 60. As shown, the cam-bar is supposed to be moving to the right.

Referring to Figs. 8 to 14, inclusive, 19 represents the cylinder of the motor, and cast integral therewith and on the back side is a valve-casing 20. This casing is bored centrally to receive the sleeve 61. The casing is cored out at a number of points to form ports, and registering with these ports are openings 63, formed in the sleeve. The advantage of these arrangements is that the ports or openings 63 can be accurately made with respect to each other and the sleeve afterward slipped into place. The sleeve is held against longitudinal movement by the detachable piece 64, which is bolted to the lower end of the valve-casing and acts as a guide for the lower end of the valve-stem. This piece also contains a chamber 65, which collects any fluid that may leak around the stem. The lower end of the chamber is connected to the exhaust-pipe 66. The ports 62 at the extreme ends of the valve-casing are connected to the exhaust. The central port 67 is connected to the source of pressure, and the ports 68 and 69 are respectively connected to the right-hand and the left-hand ends of the cylinder, as viewed in Fig. 8. Mounted within the sleeve is a balanced piston-valve 70, each piston having serrated faces which permit a certain amount of fluid to enter the cylinder prior to the complete opening of the valve. The piston-like heads on the valve-stem are so related to the ports 63 in the sleeve that there is little or no overlap. In this connection it should be noted that the bottoms of the serrations are covered when the valve is closed. The upper end of the valve-stem is attached to a cylindrical guide 71, that makes a good working fit with the casing 21, mounted on the top of the valve-casing. The upper end of the valve-casing is provided with a groove 72 for collecting any fluid which may leak out through the joints. This groove is connected to the passage 73, which extends down through the valve-casing, and the drip therefrom can be collected in any suitable manner. The cylindrical guide 71 is slotted to receive the forked ends of the lever 22 and also the end of the restoring-cam 23.

In Fig. 9 the piston-valve is shown in its extreme lower position, and fluid is supposed to be passing from the inlet-port 67 to the port 69, leading to the left-hand end of the cylinder.

In Fig. 10 the piston-valve is shown in its raised position, and motive fluid is supposed to be passing from the inlet-port 67 to the port 68, which is connected to the right-hand end of the cylinder, the left-hand end of the cylinder being connected to the exhaust through the ports 62 and 69.

In Fig. 12 is shown the relation of the inlet-port 67 to the ports in the sleeve 61. It also shows the relation of the serrated faces of the piston-valve 70 to the ports or openings in the sleeve.

In Fig. 13 is shown the relation of the port 68 to the sleeve 61 and the passage 74, leading to the right-hand end of the cylinder, as viewed in Fig. 8.

Referring to Figs. 2, 3, 5, and 15, the construction and arrangement of the emergency device for shutting all of the valves when the supply of lubricant fails will be described. 30 represents a bracket which is attached to a suitable stationary part, such as the casing of the dynamo. In the bracket is formed a cylinder 40, within which is located a piston 75. The lower end of the cylinder is closed by a head 76, which prevents the escape of fluid at this point. The upper side of the piston is provided with a rod which extends through the upper head 77 of the cylinder and engages with the floating lever 31, the latter being pivoted to the bracket at 39. The weight 32, mounted on the outer end of the arm, tends at all times to move the arm to the position shown in the figures and cause the piston-valve controlling the motor to open in a direction to admit fluid to the left-hand side of the piston—in other words, to return the latter to its initial position. This tendency of the weight is opposed by the pressure of the lubricating fluid on the step-bearing, and so long as the pressure is maintained the lever will be kept in a raised position; but when the pressure falls below a certain point the weight overbalances the pressure and pushes the piston downward.

In the floating lever 31 is mounted a rock-shaft 33, which rigidly connects the arm 34 (shown in Fig. 15) with the arm 35, the former being connected to the speed-responsive device and the latter to the valve-actuating lever.

In Fig. 16 is shown the relation of the parts when the weight or other load 32 on the floating lever 31 has overcome the pressure on the step-bearing or other device which controls its action and the restoring device 23 is moved to its extreme right-hand position. The piston-valve for controlling the hydraulic motor is in the central position.

In Fig. 17 the floating lever 31 and its weight are shown in a raised position, and the governor through the system of levers has moved the piston-valve 70 into a position to cause fluid to be admitted to the right-hand end of the cylinder, as viewed in Figs. 1 and 5, and cause an increase in the volume of motive fluid delivered to the bucket-wheel. In this figure the restoring device 23 is shown in its extreme right-hand position.

In Fig. 18 the floating lever 31 is in the same position as before, but the restoring device 23 has moved to its extreme left-hand position, showing that all of the nozzle-valves are open, and the piston-valve 70 has been moved by the restoring device until it occupies a central or initial position.

In Fig. 19 the floating lever 31 remains in the same position as before, showing that the pressure on the step-bearing is unimpaired. The piston-valve 70, however, has been moved by the governor-weights to a position where it permits fluid to pass from the inlet-port 67 to the port 68, which leads to the left-hand end of the motor, as viewed in Fig. 5, which causes a decrease in the amount of motive fluid delivered to the turbine-wheel.

In Fig. 20 the floating lever 31 is in its normal position, and the governor has moved the piston-valve 70 to its extreme upper position, whereby a maximum amount of fluid is being admitted to the cylinder of the hydraulic motor to cause it to close one or more of the nozzle-valves. The restoring device 23 is shown at about three-quarters stroke.

Since the accumulator 44 contains fluid under pressure, which is prevented from returning to the source of supply by the check-valve 45, there is always fluid enough and under the requisite pressure to move the piston of the motor to its right-hand or initial position whenever the weight 32 or other load overcomes the piston 76, showing that the pressure on the step-bearing has decreased by a certain amount and that it is necessary to shut down the machine.

It is to be noted that the pressure within the steam-chest tends at all times to seat the valves. In other words, the valves tend to return to the "safety" or closed position and cut off the supply of motive fluid to the bucket-wheel.

By placing the valve-stems and their actuating mechanism below the steam-chest the valve-stems are located on the low-pressure side and are therefore cut off from the action of the motive fluid, which is especially important when superheated steam is employed as a motive fluid. The long sleeve which surrounds the valve-stem forms a water-packing and prevents burning due to the use of hot gases.

The word "governor" as used in the claims is to be understood as including any sort of a device which is responsive to load or speed changes of the turbine. It is obvious that the character of the governor can be widely varied without departing from the spirit of my invention. It is also to be understood that the invention in certain of its broader aspects is not limited to the particular arrangement of the cam-bar shown.

In accordance with the provisions of the patent statutes I have described the principle of operation of my invention, together with the apparatus which I now consider to represent the best embodiment thereof; but I desire to have it understood that the apparatus shown is only illustrative and that the invention can be carried out by other means.

What I claim as new, and desire to secure by Letters Patent of the United States, is—

1. A governing mechanism for turbines, comprising a plurality of individual valves, a governor, and a motor, in combination with a reciprocating element actuated by the motor and provided with longitudinally-extending cam surfaces or projections arranged in separate and overlapping sets for actuating the valves.

2. A governing mechanism for turbines, comprising a plurality of individual valves, a governor, and a motor, in combination with a reciprocating element actuated by the motor and provided with parallel and separate sets of overlapping cam projections, one set of projections acting on a part of the valves, the other set of projections acting on the remainder.

3. A governing mechanism for turbines, comprising a plurality of individual valves, each controlling the passage of fluid to the turbine, and a governor, in combination with a reciprocating cam-bar, a reversible fluid-actuated motor for actuating the bar which is started into action by the governor, and a restoring device acting independently of the governor for stopping the motor.

4. A governing mechanism for turbines, comprising a plurality of individual valves, each controlling the passage of fluid to the turbine, and a governor, in combination with a reciprocating cam-bar having two or more sets of projections thereon, each set engaging with the valves, a reversible motor for moving the bar in one direction or the other in response to the governor and a restoring device acting independently of the governor for stopping the motor.

5. In a governing mechanism for turbines, the combination of a movable element having parallel sets of longitudinally-overlapping cam-surfaces with a plurality of valves some of which are actuated by one set of cam-surfaces, while certain others are actuated by another set.

6. In a governing mechanism for turbines, the combination of an element having sets of cam-grooves which are substantially alike in form, but are arranged in different planes, a plurality of valves arranged in the same plane certain of which are acted upon by the cam-grooves which are in one plane while the remainder are acted upon by those in a different plane and means located in the grooves for imparting motion to the valves.

7. In a governing mechanism for turbines, the combination of a governor responsive to load changes, a cam-bar having sets of projections arranged in parallel rows and spaced apart, and a plurality of individual valves for admitting fluid to the turbine, the valves being so arranged that alternate ones engage cam projections in the same set, the projections in one set being staggered with respect to those in another set.

8. In a governing mechanism for turbines, the combination of a movable cam-bar having cam surfaces or projections arranged in sets, a plurality of valves, cross-heads for the valves which are guided by the bar, and means for transmitting motion from the bar to the valves.

9. In a governing mechanism for turbines, the combination of a bar having cam surfaces or projections arranged in sets, a plurality of valves, and slotted cross-heads for the valves, which engage opposite sides of the bar and are guided thereby.

10. In a governing mechanism for turbines, the combination of a bar having cam-slots formed therein, a plurality of valves each of which is provided with a slotted actuator through which the bar extends, and means passing through the slots for imparting the movement of the bar to the valves.

11. In a governing mechanism for turbines, the combination of a chest, a plurality of valves mounted therein, a valve-actuator, a casing therefor, and means for detachably securing the casing to the chest so that the actuator can be removed without disturbing the valve-chest.

12. In a governing mechanism for turbines, the combination of a chest, valves mounted therein, a valve-actuator, a casing therefor, means for detachably securing the casing to the chest, and packings for the stems of the valves, which are carried by said means.

13. In a governing mechanism for turbines, the combination of a chest, valves mounted therein, a valve-actuator, a casing surrounding the actuator, a detachable frame or member which is attached to the chest and is provided with extensions that are secured to the casing, and valve-stems which extend from the chest to the actuator and are situated between said extensions.

14. In a governing mechanism for turbines, the combination of a chest, valves mounted therein, a valve-actuator, a casing which surrounds the actuator and is supported some distance from the chest, valve-stems which extend across the space between the chest and casing, and valve-adjusting means which are located in said space.

15. In a governing mechanism for turbines, the combination of a plurality of individual valves, a cam-bar which actuates the valves and also guides them, a casing for the bar which also acts as a guide for the valves, and guides supported by the casing, which engage the bar.

16. In a governing mechanism for turbines, the combination of a chest having fluid-discharging passages, a nozzle attached to the chest, a plurality of valves controlling the supply of fluid through the passages to the nozzle, and a valve-actuator which is supported in a casing hung from the under side of the chest.

17. A governing mechanism for turbines, comprising a valve for controlling the passage of fluid to the turbine, and a governor, in combination with a motor, a cam for moving the valve, a motor-controlling means, and a device attached to the cam for restoring the motor-controlling means to its initial position.

18. In a governing mechanism for a turbine, the combination of a mechanism controlling the admission of fluid to the turbine, a motor for moving the mechanism, a controller for the motor, and a support for the controller, which is moved by the motor.

19. In a governing mechanism for a turbine, the combination of a valve controlling the admission of fluid to the turbine, a motor for moving the valve, a lever for controlling the motor, and a device moved by the motor which supports the fulcrum of the lever.

20. In a governing mechanism for a turbine, the combination of a means for controlling the admission of fluid to the turbine, a bar having a cam-surface for actuating the valve, a motor for moving the bar, a controller for the motor, and a restoring device which has a cam-surface corresponding to that on the bar.

21. In a governing mechanism for turbines, the combination of a plurality of valves controlling the admission of fluid to the turbine, a bar having sets of cam projections or surfaces, a motor for moving the bar, a controller therefor, and a restoring device for the controller, which has cam projections or surfaces corresponding to those on the bar.

22. In a governing mechanism for turbines, the combination of an element having independent sets of cam projections for controlling the admission of fluid to the turbine, a controller for regulating the action of said element, and a restoring device for moving the controller to a given position, which is provided with a single set of cam projections which correspond to the independent sets on said element.

23. In a governing mechanism, the combination of a bar having sets of cam projections, those of one set being staggered with respect to those in another, a motive-power agency for moving the bar, and a device for stopping the motor, which contains a single set of cam projections corresponding to the projections on the bar.

24. In a governor for turbines, the combination of an element having cam projections thereon, valves moved by the projections, a motive-power agency for moving the said element, a controller for regulating the movements of the element, and a device for restoring the controller to a given position, which has projections of the same pitch as those on the element, but of less magnitude.

25. In a governing mechanism for turbines, the combination of a bar having sets of cam-grooves spaced apart and having projections, those of one set alternating with those in another set, individual and successively-operated valves, and means located in the grooves and acted upon by the cam surfaces or projections for moving the valves.

26. In a governing mechanism for turbines, the combination of a movable element having cam surfaces or projections arranged in sets, the surfaces or projections of the sets being of equal pitch and those of one set alternating with those of another set, individual valves successively operated by the cam surfaces or projections, a motive-power agency for moving the said member and a device actuated by the moving element for controlling the motive-power agency.

27. In a governing mechanism for turbines, the combination of a governor, a plurality of individual valves, a means for operating the valves, a motor for actuating the means, a controller for the motor, which is moved by the governor, and a device for modifying the action of the governor on the controller, which is attached to and is movable with the valve-actuating means.

28. In a governing mechanism for turbines, the combination of a governor, a plurality of individual valves, a longitudinally-movable cam-bar, a reciprocating motor for moving the bar, a valve controlling the motor, a reciprocating restoring device which moves the motor-controlling valve to its initial position and is itself attached to the bar, and a speed-responsive device which opens the motor-controlling valve.

29. In a governing mechanism for turbines, the combination of a number of nozzle-valves, a cam-bar for moving them, a hydraulic motor in line with the bar for reciprocating it, a motor-controlling valve occupying a position perpendicular to the cylinder of the motor, a lever which is attached to the valve, and a support for the fulcrum of the lever, which changes its position for each new position assumed by the cam-bar.

30. In a governing mechanism for steam-turbines, the combination of a plurality of valves admitting motive fluid to the turbine, a fluid-actuated motor for moving the valves successively, and a second fluid-actuated motor which modifies the action of the first.

31. In a governing mechanism for turbines, the combination of a valve for admitting fluid to the turbine, a means for positively actuating the valve, a governor controlling the action of the means, and a device for rendering the governor inoperative as to the said means under certain conditions.

32. In a governing mechanism for turbines, the combination of a valve for admitting fluid to the turbine, a means for actuating the valve, a governor controlling the action of the means, and a pressure-responsive device for rendering the governor inoperative as to the said means under certain conditions.

33. In a governing mechanism for a turbine, the combination of a valve for admitting fluid to the turbine, a means controlling the operation of the valve, a speed-responsive device, a connection between the means and the speed-responsive device, and an emergency device which is responsive to pressure changes for modifying the action of the speed-responsive device on the means.

34. In combination, a turbine having one or more bearings, a valve for admitting fluid to the turbine, a governor for controlling the action of the valve, a means for supplying lubricant to a turbine-bearing, and means responsive to the pressure on said bearing for cutting off the supply of motive fluid to the turbine.

35. In combination, a turbine having one or more bearings, a valve for admitting fluid to the turbine, and an emergency device which is responsive to changes in pressure of the lubricant supplied to a turbine-bearing for shutting the valve.

36. In combination, a turbine having one or more bearings, a valve for admitting fluid to the turbine, and an emergency device including a hydraulic piston and cylinder for causing the valve to shut when the pressure of the lubricant supplied to a turbine-bearing falls below a certain amount.

37. In combination, a turbine, a valve controlling the admission of fluid thereto, a speed-responsive device for opening and closing of the valve to vary the amount of fluid admitted to the turbine as the load changes, which includes a floating lever, and a pressure-actuated device for modifying the action of the governor by changing the position of the pivot of said lever.

38. In combination, a turbine, a plurality of admission-valves, an actuator for the valves, a means controlling the actuator, a speed-responsive device, a connection between the means and said device, which includes a lever, and a fluid-actuated means for changing the position of the lever-pivot.

39. In combination, a turbine, an admission-valve, an actuator for the valve, a means controlling the actuator, a speed-responsive device, a connection between the means and said device, a lever which is pivoted at one end to a fixed support and is loaded at the other, a hydraulic motor which raises or lowers one end of the lever in response to changes in pressure of the lubricant, and a second lever which is pivoted on the first and forms a part of said connection.

40. In combination, a turbine, the wheel of which is supported by fluid under pressure, a valve for governing the supply of motive fluid to the wheel, a hydraulic motor for moving the valve, and a source of fluid-pressure which supplies fluid to support the weight of the moving part of the turbine and also to operate the motor.

41. In combination, a turbine, a valve for regulating the admission of motive fluid thereto, a motor for actuating the valve, a source of energy for the motor, and an auxiliary source of supply for the motor, which is operative when the main source of energy fails.

42. In combination, a turbine, a valve for regulating the admission of motive fluid thereto, a hydraulic motor for actuating the valve, and an accumulator in circuit with the motor for operating it under abnormal conditions.

43. In combination, a turbine, a valve for regulating the admission of motive fluid thereto, a hydraulic motor for actuating the valve, an accumulator in circuit with the motor for operating it under abnormal conditions, and a check-valve for preventing the return of fluid from the accumulator in case the source of fluid-supply fails.

44. In combination, a turbine, a hydraulic motor controlling the admission of motive fluid to the turbine, a bearing which supports the weight of the revolving structure of the turbine, and a source of fluid-supply which is common to the motor and bearing.

45. In combination, a turbine, a hydraulic motor controlling the admission of motive fluid to the turbine, a second motor which under abnormal conditions modifies the action of the first, and a source of fluid-supply which is common to both motors.

46. In combination, a turbine, a hydraulic motor controlling the admission of motive fluid to the turbine, a bearing which supports the weight of the revolving structure of the turbine, a second motor which modifies the action of the first, and a source of fluid under pressure, which is common to both motors and the bearing.

47. In a governing mechanism for turbines, the combination of a valve for controlling the admission of motive fluid to the wheel, a hydraulic motor for actuating the valve, a valve-casing, a sleeve removably mounted therein, which contains ports registering with those in the casing, and a valve mounted in the sleeve for controlling the ports.

48. In a governing mechanism for turbines, the combination of a valve for controlling the admission of motive fluid to the wheel, a hydraulic motor for actuating the valve, a valve-casing, a valve mounted therein, the stem of which extends through the casing, a guide for one end of the stem, an actuating-lever attached thereto, and a valve-restoring device which passes through the guide during its movement.

49. In a governing mechanism for turbines, the combination of a valve for controlling the admission of motive fluid to the wheel, a fluid-actuated motor for moving the valve, a valve-casing, and a piston-valve mounted therein, the heads of which are serrated.

50. In a governing mechanism, the combination of a wheel-casing, a valve-chest which is affixed thereto and overhangs the side of the casing, valves mounted in the chest, an actuator for the valves also located at one side of and away from the casing and attached to the chest, a motive-power agency for moving the actuator, also carried by the chest, and a speed-responsive device which controls the motor.

51. In a governor for vertical turbine-generators, the combination of a turbine comprising relatively rotatable buckets, a generator mounted above the turbine, a speed-responsive device mounted on the main shaft, a lever which is pivotally attached to the generator, a valve for admitting motive fluid to the buckets, which is adjacent to the turbine part of the unit, a hydraulic motor for moving the valve, a valve for controlling the motor, and an operating connection between the lever and the valve.

52. In a governing mechanism for turbines, the combination of a plurality of separately-actuated valves, a chest for the valves, which is provided with an opening in line with the valves, a removable cover for the chest, an actuator for the valve, which is situated below it, a stem for the valve, the valve and stem being removable through the opening in the chest, and a means accessible from a point outside of the chest for connecting and disconnecting the valve from the actuator.

53. In a governing mechanism for turbines, the combination of a bucket-wheel, a nozzle, a valve for admitting motive fluid to the turbine, a cross-head for actuating the valve, a cam for moving the cross-head, and a yielding connection between the valve-stem and the cross-head.

54. In a governing mechanism for turbines, the combination of a steam-chest, a plurality of separately-actuated valves, stems for the valves, which are on the low-pressure side, a cam for actuating the valves successively, and a support for the cam, which is attached to the steam-chest.

In witness whereof I have hereunto set my hand this 4th day of February, 1904.

RICHARD H. RICE.

Witnesses:
DUGALD McK. McKILLOP,
JOHN A. McMANUS.